United States Patent
Taka et al.

(10) Patent No.: US 7,106,942 B2
(45) Date of Patent: Sep. 12, 2006

(54) IMAGE FORMING APPARATUS

(75) Inventors: Kyosuke Taka, Nara (JP); Shoichi Fukutome, Yamatokoriyama (JP); Kazunobu Takahashi, Hiroshima (JP); Hidekazu Sakagami, Kashihara (JP); Takao Horiuchi, Nara (JP); Yoshitaka Okahashi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1240 days.

(21) Appl. No.: 09/842,036

(22) Filed: Apr. 26, 2001

(65) Prior Publication Data

US 2002/0015165 A1 Feb. 7, 2002

(30) Foreign Application Priority Data

Apr. 26, 2000 (JP) ............................. 2000-126092

(51) Int. Cl.
H04N 9/00 (2006.01)
(52) U.S. Cl. ............................. 386/1; 386/44; 399/301
(58) Field of Classification Search ................. 386/46, 386/95, 107, 117, 113; 399/301
See application file for complete search history.

(56) References Cited

U.S. PATENT DOCUMENTS

| 5,781,822 A | 7/1998 | Nishiyama et al. |
| 5,845,185 A | 12/1998 | Sakagami et al. |
| 5,915,074 A | 6/1999 | Shimazawa et al. |
| 5,926,684 A | 7/1999 | Horiuchi et al. |
| 6,189,882 B1 | 2/2001 | Horiuchi et al. |
| 6,240,271 B1 | 5/2001 | Shimazawa et al. |
| 6,408,156 B1 * | 6/2002 | Miyazaki et al. ........... 399/301 |

FOREIGN PATENT DOCUMENTS

| JP | 3-139961 A | 6/1991 |
| JP | 6-95474 A | 4/1994 |

\* cited by examiner

Primary Examiner—Huy Nguyen
(74) Attorney, Agent, or Firm—Birch, Stewart, Kolasch & Birch, LLP

(57) ABSTRACT

A set pattern image with no displacement is recorded onto recording paper. In this set pattern image, the centers of auxiliary patterns are displaced in an auxiliary scan direction off a referential straight line passing through the centers of primary patterns. The image forming apparatus causes the set pattern image to be read, measures the displacements of the auxiliary patterns in the auxiliary scan direction off the referential straight line, and compensates for the displacements, such as by adjusting writing timings in the auxiliary scan direction so that the displacements become zero.

23 Claims, 11 Drawing Sheets

F I G. 4 (a)
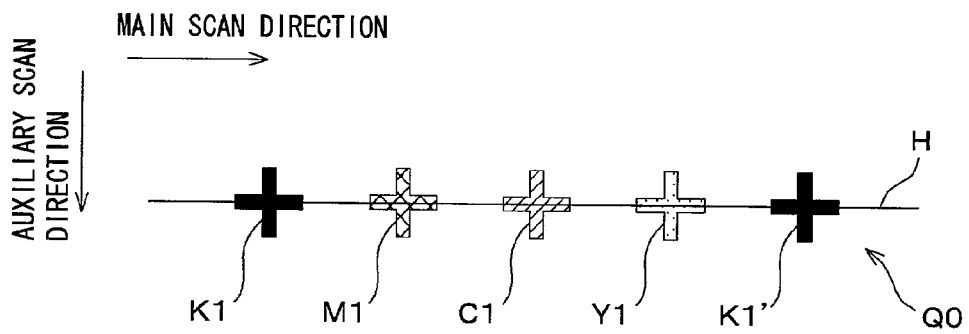
F I G. 4 (b)
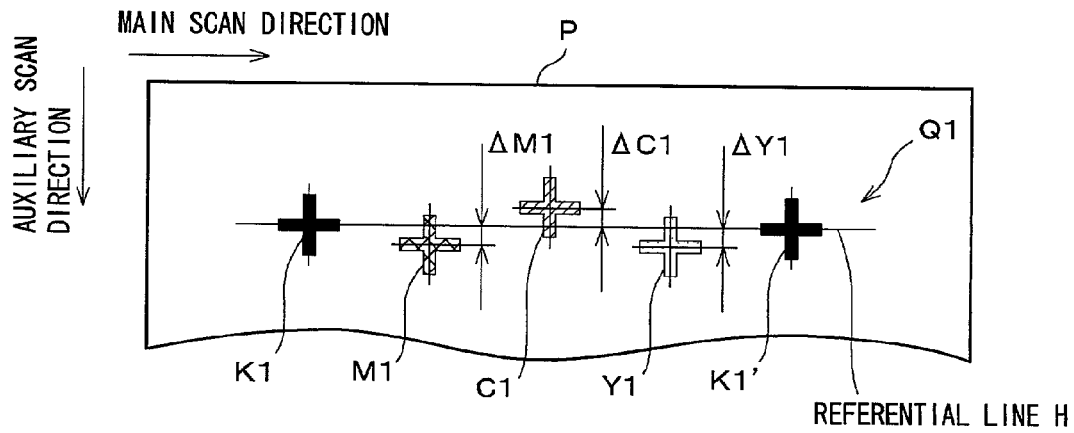
F I G. 4 (c)
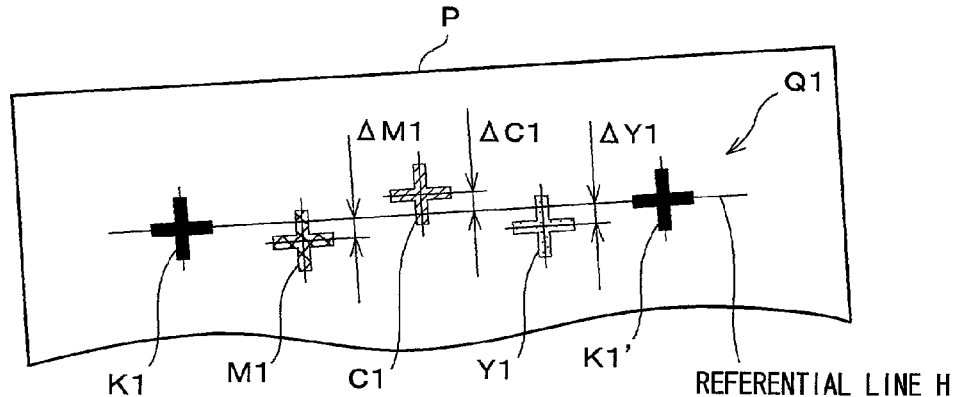

F I G. 6 (a)
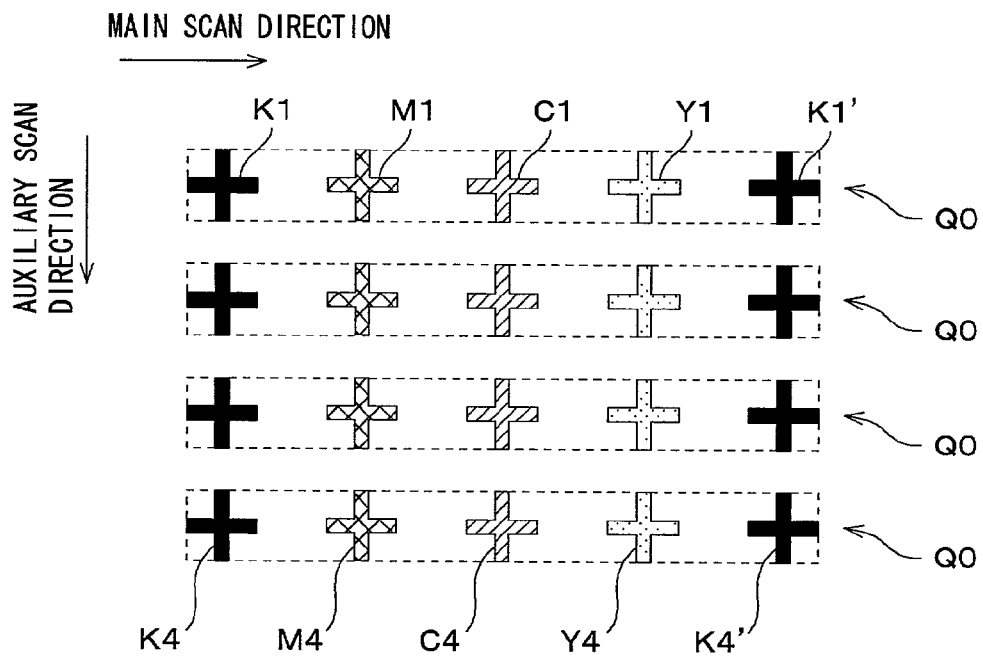
F I G. 6 (b)
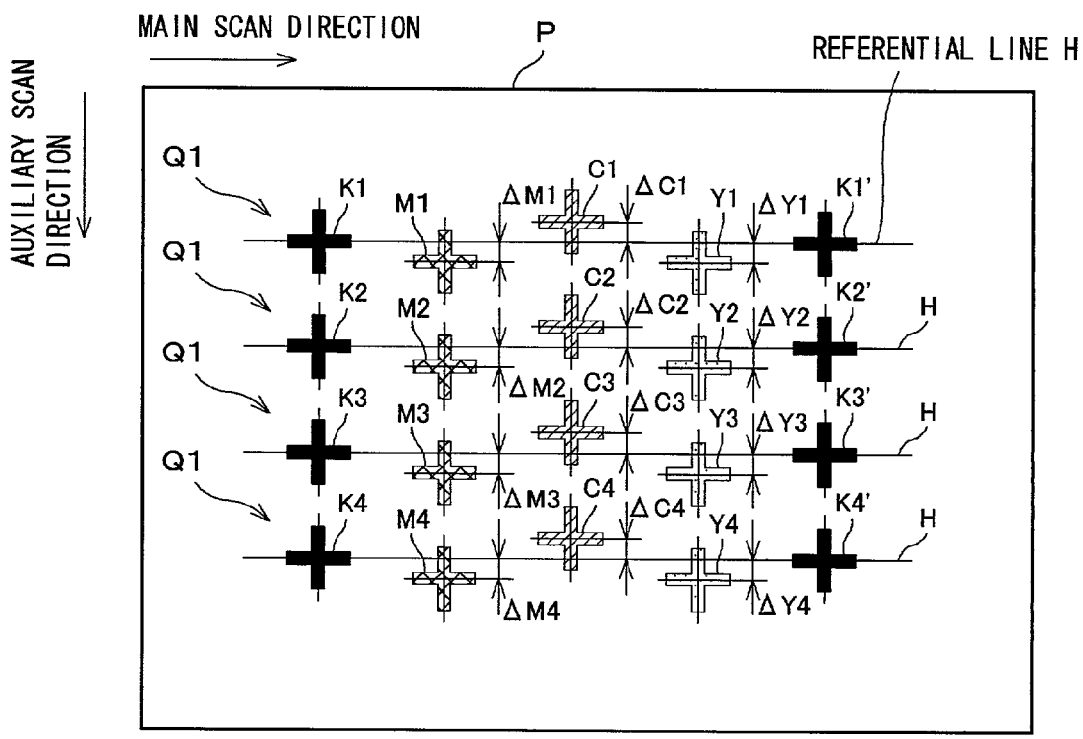

F I G. 9
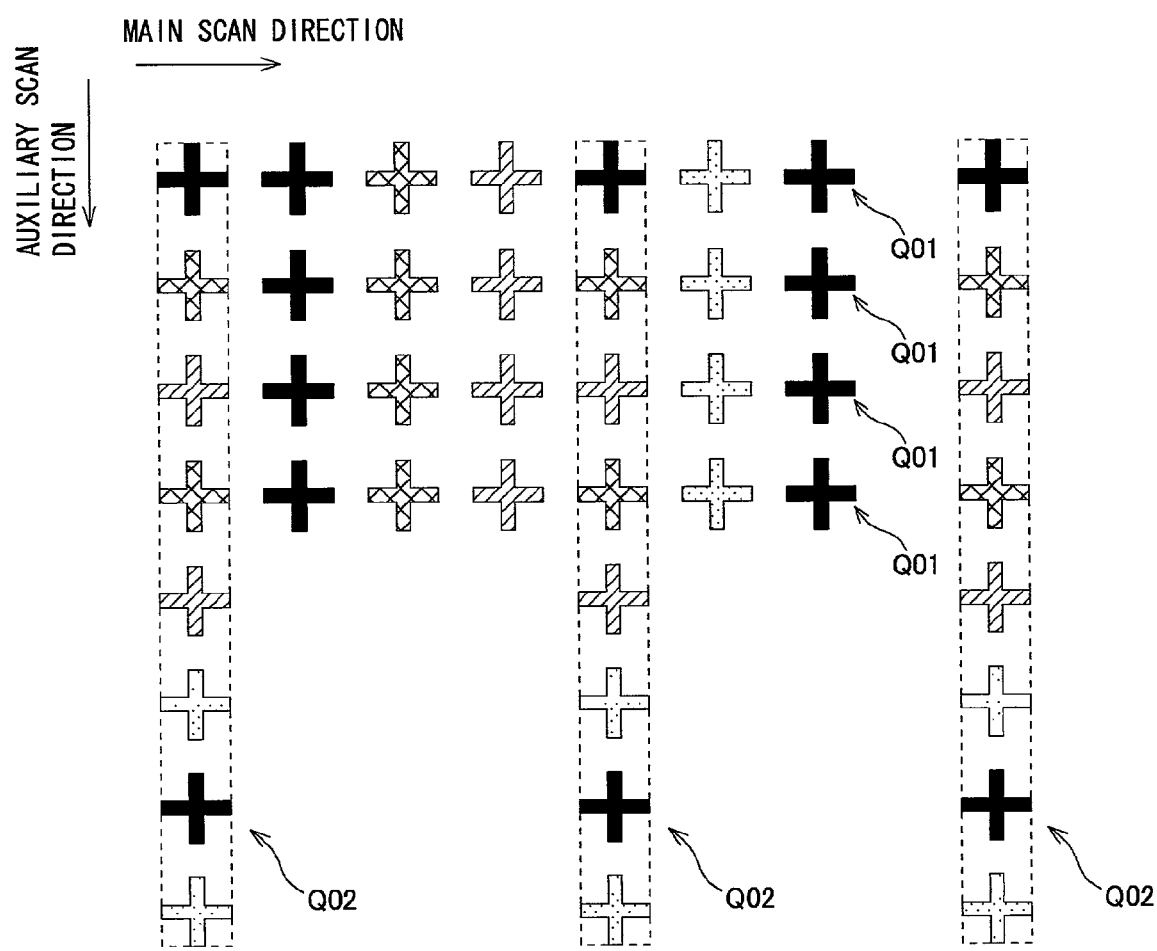

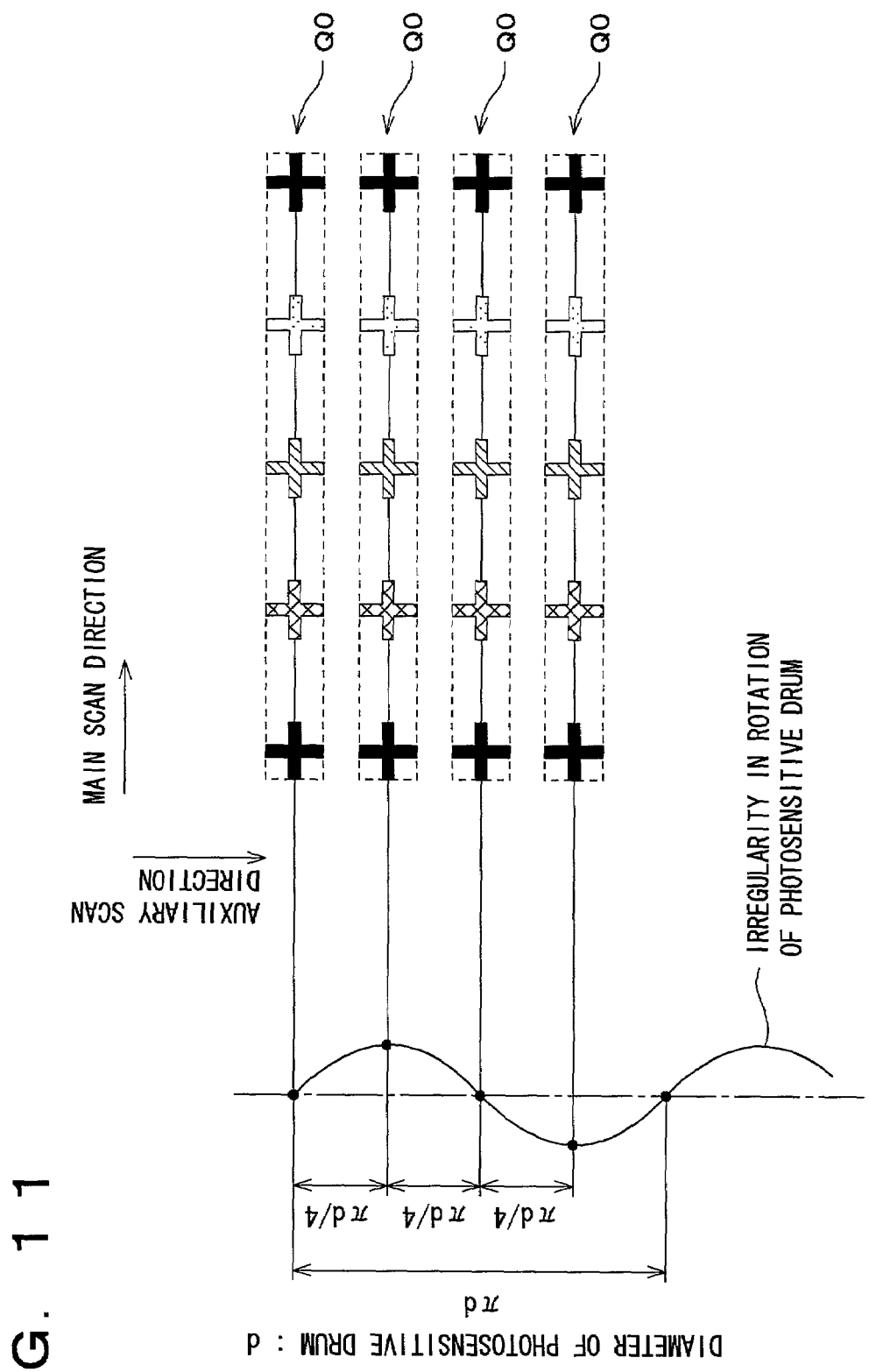

IMAGE FORMING APPARATUS

FIELD OF THE INVENTION

The present invention relates to an image forming apparatus for recording a color image by stacking component color images on a recording medium.

BACKGROUND OF THE INVENTION

In a conventional color image forming apparatus, toner images of component colors, such as yellow, magenta, cyan, and black, are formed on a photosensitive drum, transferred and stacked on recording paper, and then fixed to form a color image on the recording paper. If the toner images of component colors are not stacked appropriately, colors are not reproduced as intended due to color displacement. The result is a color image which looks ugly.

To address this problem, a color displacement determining pattern for determining how much the colors are displaced is formed on the recording paper or a carrier for the recording paper and then inspected to measure a color displacement. The inspection, in its most primitive form, was done visually by, for example, examining an image formed on recording paper using a highly efficient magnifying glass with a scale. Alternatively, the color displacement was measured mechanically using a special measurement instrument. Drawbacks of these methods include the need for dedicated equipment for the inspection and a prolonged process to perform the measurement and accompanying cost increases in compensating for color displacements.

Another possible alternative is to provide means to check for a color displacement inside the image forming apparatus. However, when this is the case, image reading means is necessary which reads a color displacement determining pattern on the recording paper. If the image reading means is disposed solely for the inspecting purpose, the overall cost of the image forming apparatus increases; therefore, a prerequisite is that a reading device for reading an original is provided in the image forming apparatus and the device can play an additional role in the inspection. Making use of the reading device, the color displacement determining pattern is read, the color displacement is measured, and the resist of the component color images is adjusted according to the color displacement.

For example, Japanese Laid-Open Patent Application No. 3-139961/1991 (Tokukaihei 3-139961; published on Jun. 14, 1991) discloses a technique addressing the problem of inaccuracy of visual inspection and troublesome work involved. According to the technique, a test chart is formed on recording paper by two or more image forming heads and then read by image reading means. The color displacement is measured based on the reading of the test chart, and the recording timings of the image forming heads are corrected in accordance with the displacement.

However, if, as in this conventional technique, a test chart formed on recording paper is read by image reading means, since the operator places the recording paper in the image reading means, the measurement may vary depending on how he/she places the recording paper. The position of the recording paper should be carefully adjusted in the image reading means. Trouble arises where it is difficult to determine whether the recording paper is appropriately positioned and to adjust the position of the recording paper appropriately. Provided that the recording paper is ever positioned appropriately, it is still extremely difficult to position the test chart appropriately and read it using image reading means, because the recording paper may tilt while manipulating a press on the recording paper or the test chart may have been displaced on the recording paper in the first place.

Japanese Laid-Open Patent Application No. 6-95474/1994 (Tokukaihei 6-95474; published on Apr. 8, 1994) discloses a technique addressing these inconveniences. According to the technique, a pattern is produced in which there are a plurality of line elements running parallel or perpendicular to the transport direction of the recording paper and at least one line element crossing the plurality of line elements at right angles. The produced pattern is recorded on the recording paper and read using image reading means to measure displacements of the component color images and correct the resist of the component color images. Thus, the technique can solve problems that the pattern is read diagonally and resultant reading of its position is inaccurate, due to vertical or horizontal shaking or other reasons.

The use of these conventional techniques still comes short of producing satisfactory results: measurements of displacements of the component color images are adversely affected by where the pattern is positioned on the recording paper, since each piece of image forming means for forming component color images has its own irregularity in operation. The result is inaccurate correction of the resist of the component color images. In some cases, repeated measurements and corrections are necessary.

SUMMARY OF THE INVENTION

The present invention has an objective to present an image forming apparatus that can record on recording paper a pattern by which a color displacement is determined, read the pattern on the recording paper using image reading means, and obtain displacements of component color images based on the reading of the pattern, the image forming apparatus being capable of measuring displacements of component color images and thereby correcting the resist of the component color images according to the measurements without being adversely affected by a tilt of the recording paper and irregularities in operation of each piece of image forming means for forming the component color images.

An image forming apparatus in accordance with the present invention, to achieve the above objective, is an image forming apparatus for stacking and thus recording component color images on a recording medium using a plurality of image forming means, while transporting the recording medium down along a transport path, and includes:

pattern recording means for recording at least two primary patterns on the recording medium using one of the plurality of image forming means and also for recording an auxiliary pattern on the recording medium using another one of the plurality of image forming means;

measurement means for measuring a displacement of the auxiliary pattern off a straight line passing through the primary patterns on the recording medium; and adjusting means for compensating for displacements of the component color images stacked by the plurality of image forming means according to a measurement of the displacement of the auxiliary pattern.

According to the present invention arranged in this manner, the displacement of an auxiliary pattern off the straight line passing through the primary patterns is measured. In this case, even if the recording medium tilts or is out of a predetermined position when it is read, since the auxiliary pattern does not move relative to the straight line passing through the primary patterns, the displacement of the auxiliary pattern can be precisely measured. Therefore, according to the measurement of this displacement, the displacements of the component color images stacked by the plurality of image forming means can be compensated for with high precision. Further, the measurement does not need to be repeated. Adjustment operation can be facilitated and requires less time.

The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIG. 4(a) is a drawing showing an original set pattern image in accordance with the embodiment.

FIG. 4(b) is a drawing showing the set pattern image in FIG. 4(a) being recorded on recording paper.

FIG. 4(c) is a drawing showing the set pattern image in FIG. 4(a) being recorded on recording paper and tilting.

FIG. 6(a) is a drawing showing set pattern images arranged in an auxiliary scan direction.

FIG. 6(b) is a drawing showing the set pattern images in FIG. 6(a) being formed on recording paper.

FIG. 9 is a drawing showing set pattern images arranged both in the main scan direction and the auxiliary scan direction.

FIG. 11 is a drawing showing set pattern images positioned at predetermined places in the auxiliary scan direction.

DESCRIPTION OF THE EMBODIMENT

The following will describe an embodiment of the present invention in detail in reference to attached figures.

Figure 1:
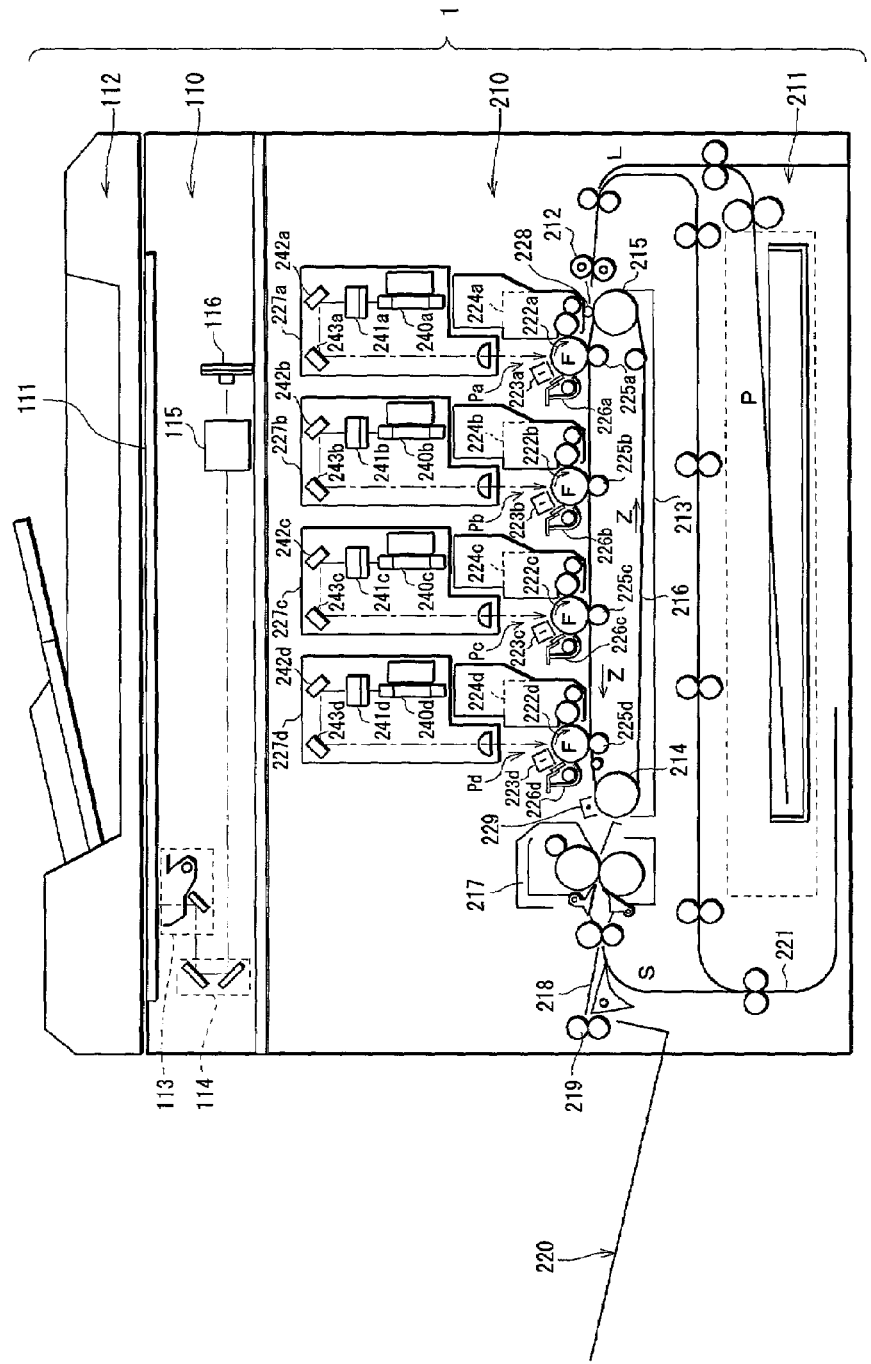
FIG. 1 is a side view schematically showing a mechanism of a color image forming apparatus in accordance with an embodiment of the present invention.
Figure 2:
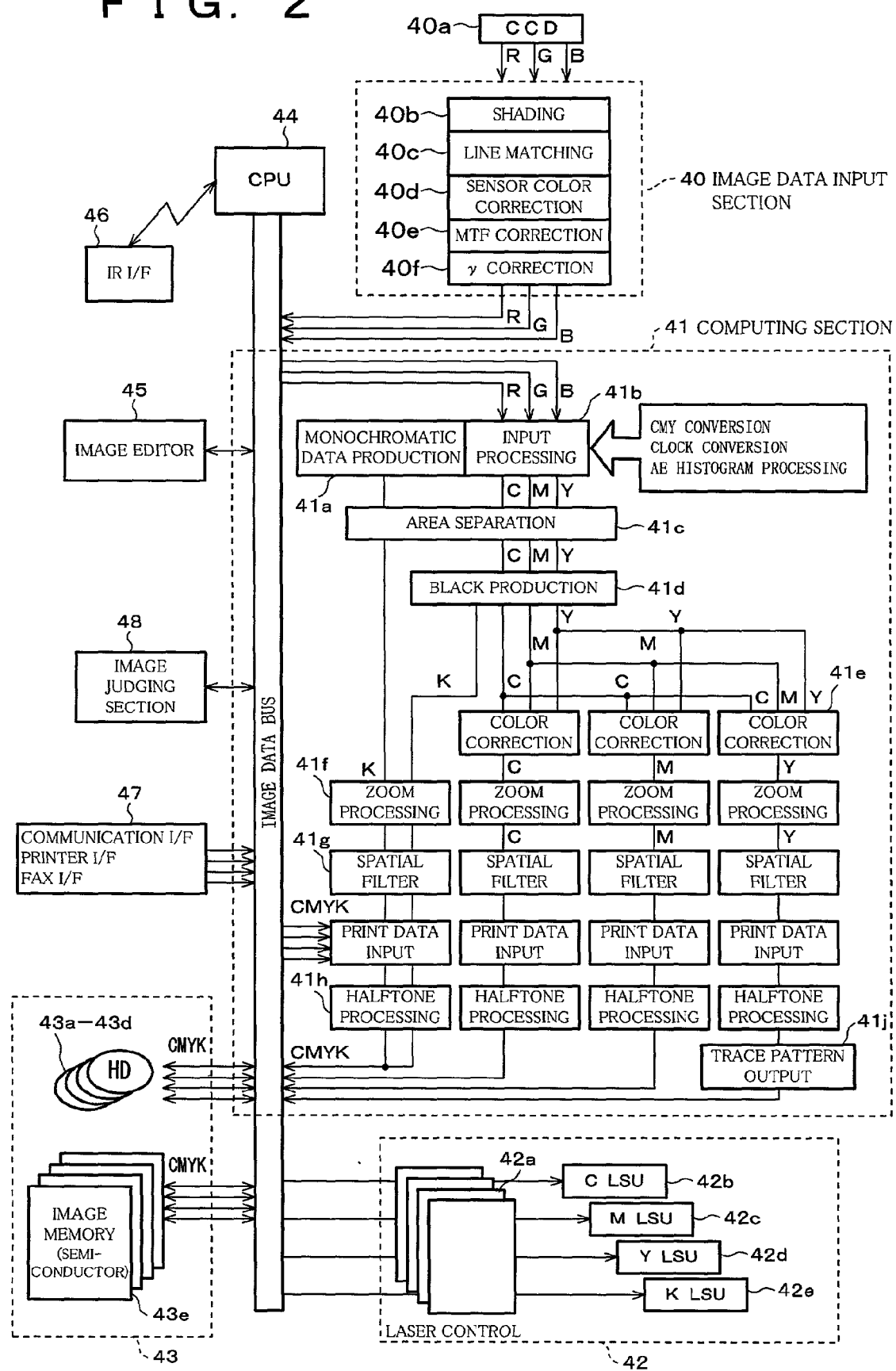
FIG. 2 is a block diagram schematically showing an arrangement of an image processing section in the color image forming apparatus in accordance with the embodiment.
Figure 3:
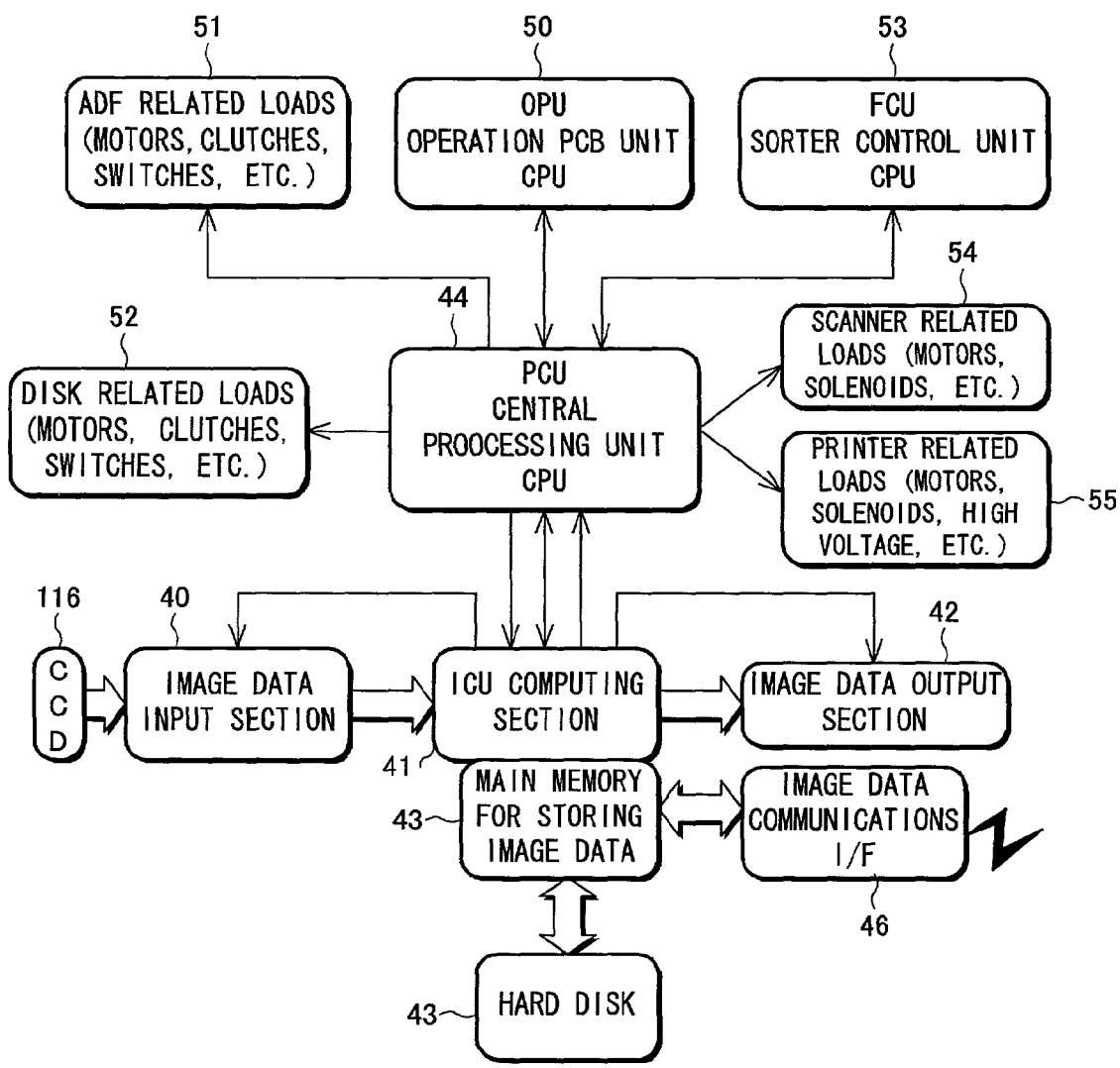
FIG. 3 is a block diagram schematically showing an arrangement of an operation control section in the color image forming apparatus of the embodiment.

FIGS. 1, 2, and 3 show a color image forming apparatus as an embodiment of the present invention. FIG. 1 is a side view schematically showing a mechanism of the color image forming apparatus of the present embodiment. FIG. 2 is a block diagram schematically showing an arrangement of an image processing section in the color image forming apparatus. FIG. 3 is a block diagram schematically showing an arrangement of an operation control section in the color image forming apparatus.

First, the color image forming apparatus will be roughly described in accordance with the present embodiment in reference to FIGS. 1, 2, and 3.

The color image forming apparatus in accordance with the present embodiment copies an image, i.e., reads an original image and reproduces an identical image on recording paper. As shown in FIG. 1, the color image forming apparatus in accordance with the present embodiment is provided with an original document platen 111 on the top of a device main body 1. Near the original document platen 111 is there provided an operation panel which will be detailed later. Inside the device main body 1 are there provided an image read section 110 and an image forming section 210. On the top of the original document platen 111 are there provided an RADF (Recirculating Automatic Document Feeder) 112 which is supported so that it can freely open/close with respect to the original document platen 111.

The RADF 112 transports an original document to a predetermined position on the original document platen 111 so that the original document faces the image read section 110. After the image on one of the two sides of the original document is completely read by the image read section 110, the RADF 112 turns over the original document and transports it back to the predetermined position on the original document platen 111 to enable the image read section 110 to read the image on the other side of the original document. After the images on both sides of the original document are completely read, the RADF 112 ejects the original document and then transports and turns over another original document. Such transport and turning over of the original document are controlled in relation with the overall operation of the color image forming apparatus. The original document may of course be ejected after the image is read on one side, but not the other.

The image read section 110 reads an image on an original document transported onto the original document platen 111 by the RADF 112. The image read section 110 includes first and second original document scan bodies 113, 114 which reciprocally move parallel to the bottom surface of the original document platen 111, an optical lens 115, and a CCD line sensor 116 which is a photoelectric transducer.

The first original document scan body 113 reciprocally moves parallel to the bottom surface of the original document platen 111 at predetermined scan speed, while keeping an invariable distance from it. The first original document scan body 113 includes an exposure lamp for illuminating the surface of the original document and a first mirror for directing the reflection off the original document in a predetermined direction. The second original document scan body 114 reciprocally moves parallel to the first original document scan body 113, while keeping an invariable speed relationship with it. The second original document scan body 114 receives the light reflected off the original document via the first mirror of the first original document scan body 113 and is provided with a second mirror and a third mirror for directing the reflected light in a predetermined direction.

The optical lens 115 receives and converges the light that has been reflected off original document and directed by the third mirror of the second original document scan body 113 to produce an optical image on the CCD line sensor 116.

The CCD line sensor 116 photoelectrically converts the optical image sequentially to read a black and white or color image and produce an output image signals representing the image. The CCD line sensor 116 is composed of 3-line color CCDs for producing image signal outputs representing line data divided into component colors R (red), G (green), and B (blue).

Defining the scanning by the first and second original document scan bodies 113, 114 as the auxiliary scan and the scanning by the CCD line sensor 116 as the main scan, the main scan is repeated twice or more in a single auxiliary scan. Hence, the image on the original document is read. During the reading, the CCD line sensor 116 repeatedly outputs line data that corresponds to the pixels on a line of the main scan to make the line data (image signals) continuously available. The image signal is transferred to an image processing section (detailed later) where it is processed.

Below the image forming section 210 is there provided a paper feeding mechanism 211 for separating a pile of recording paper (recording mediums) P and feeding it sheet by sheet to the image forming section 210. The recording paper P, having attributes similar to those of a cut sheet, is loaded and stored in a paper tray until it is separated and fed sheet by sheet to the image forming section 210 by the paper feeding mechanism 211. The recording paper P is guided to a pair of resist rollers 212 disposed in front of the image forming section 210. As a sensor (not shown) detects the leading end of the recording paper P, the motion of the recording paper P is temporarily suspended by the resist rollers 212 in response to a detection signal from the sensor. Subsequently, the recording paper P is transported to the image forming section 210 at a transport timing controlled by the resist rollers 212. The image forming section 210 forms an image on one side of the recording paper P. Then, the recording paper P is turned over and guided again to the resist rollers 212, and the image forming section 210 forms an image on the remaining side of the recording paper P. Thereafter, the recording paper P is ejected. The recording paper P may of course be ejected after an image is formed on one side, but not the other.

Below the image forming section 210 is there provided a transfer and transport belt mechanism 213. The transfer and transport belt mechanism 213 includes a driving roller 214, a driven roller 215, and a transfer and transport belt 216 hung between the rollers 214, 215 and transports the recording paper P in a direction Z by electrostatically attracting it onto the transfer and transport belt 216. While the recording paper P is transported by the transfer and transport belt mechanism 213, toner images are transferred onto the recording paper P in a manner detailed later.

A paper attracting (brush) charger 228 is provided right after the resist rollers 212 to so charge the transfer and transport belt 216 that the transfer and transport belt 216 can securely attract the recording paper P onto it during the transport in the image forming section 210.

A discharger 229 is provided between the image forming section 210 and a fixer 217. An alternating current is applied to the discharger 229 to take off the transfer and transport belt 216 the recording paper P electrostatically attracted to the transfer and transport belt 216.

Located downstream of the transfer and transport belt mechanism 213 and provided with a pair of fixing rollers, the fixer 217 receives the recording paper P from the transfer and transport belt mechanism 213 and fixes the toner image transferred onto the recording paper P there. Thereafter, the recording paper P is moved through a transport path switching gate 218 and ejected by an ejection roller 219 on to an ejected paper tray 220 attached to an exterior of the device main body 1.

The switching gate 218 selectively changes the path of the recording paper P after fixing, depending on whether the recording paper P is to be ejected onto the ejected paper tray 220 or resupplied to the image forming section 210. If the recording paper P is to be channeled by the switching gate 218 and resupplied to the image forming section 210, the recording paper P is turned over as it passes through the switch-back transport path 221, and guided to the image forming apparatus 210.

Above, and in proximity of, the transfer and transport belt 216 in the image forming section 210 are there provided a first image forming station Pa, a second image forming station Pb, a third image station Pc, and a fourth image station Pd in this sequence when viewed from the upstream side of the transport path for the recording paper P. As described above, the recording paper P on the transfer and transport belt 216 is transported in a direction Z. Hence, the recording paper P passes through the first, second, third, and fourth image forming stations Pa, Pb, Pc, Pd in this sequence. The first to fourth image forming stations Pa–Pd share a practically identical arrangement and include respective photosensitive drums 222a, 222b, 222c, 222d that are driven to rotate in a direction F.

Near the photosensitive drums 222a–222d are there provided chargers 223a, 223b, 223c, 223d for uniformly charging the photosensitive drums 222a–222d respectively, laser beam scanner unit 227a, 227b, 227c, 227d for forming latent images on the photosensitive drums 222a–222d respectively, developers 224a, 224b, 224c, 224d for developing the latent images on the photosensitive drums 222a–222d to form toner images, transfer-use dischargers 225a, 225b, 225c, 225d for transferring the toner images on the photosensitive drums 222a–222d onto the recording paper P, and cleaners 226a, 226b, 226c, 226d for removing residual toner from the photosensitive drums 222a–222d.

Each laser beam scanner units 227a–227d includes a semiconductor laser element (not shown) for emitting a laser beam modulated by an image signal, a polygon mirror (direct device) 240 for directing the laser beam emitted by the semiconductor laser element to the main scan direction, an fθ lens 241 for converging the laser beam directed by the polygon mirror 240 on the photosensitive drum 222a–222d to produce an image thereon, and mirrors 242, 243.

The laser beam scanner unit 227a modulates a laser beam based on an incoming image signal representing the black component image of a color image and thereby shines a laser beam corresponding to the black component image onto the photosensitive drum 222a. The laser beam scanner unit 227b modulates a laser beam based on an incoming image signal representing the cyan component image of the color image and thereby shines a laser beam corresponding to the cyan component image onto the photosensitive drum 222b. The laser beam scanner unit 227c modulates a laser beam based on an incoming image signal representing the magenta component image of the color image and thereby shines a laser beam corresponding to the magenta component image onto the photosensitive drum 222c. The laser beam scanner unit 227d modulates a laser beam based on an incoming image signal representing the yellow component image of the color image and thereby shines a laser beam corresponding to the yellow component image onto the photosensitive drum 222d.

The laser beams shone onto the photosensitive drums form latent images of the black, cyan, magenta, and yellow component images on the photosensitive drums 222a–222d respectively.

The developer 227a contains black toner which sticks to and thus develops the latent image of the black component image on the photosensitive drum 222a to produce a black toner image. The developer 227b contains cyan toner which sticks to and thus develops the latent image of the cyan component image on the photosensitive drum 222b to produce a cyan toner image. The developer 227c contains magenta toner which sticks to and thus develops the latent image of the magenta component image on the photosensitive drum 222c to produce a magenta toner image. The developer 227d contains yellow toner which sticks to and thus develops the latent image of the yellow component image on the photosensitive drum 222d to produce a yellow toner image.

As the photosensitive drums 222a–222d rotate, the photosensitive drums 222a–222d are sequentially pressed to the recording paper P on the transfer and transport belt 216, causing the toner images on the photosensitive drums 222a–222d to be sequentially transferred and stacked on the recording paper P. Thereafter, the recording paper P is transported to the charge-removing discharger 229 where the recording paper P is rid of static electricity by the charge-removing discharger 229 and thereby taken off the transfer and transport belt 216, before being guided to the fixer 217. The fixer 217, provided with a pair of fixing rollers, receives the recording paper P from the transfer and transport belt mechanism 213 and causes the recording paper P to pass through a nip section between the fixing rollers to thereby fix the toner images transferred onto the recording paper P thereon. Then, the recording paper P passes through the transport switching gate 218 and is either ejected by the ejection roller 219 onto the ejected paper tray 220 or turned over as it passes through the switching gate 218 and the switch-back transport path 221 before being guided again to the image forming apparatus 210.

Here, the laser beam scanner units 227a–227d write images onto the photosensitive drums 222a–222d; however, a writing optical system (LED head) constituted by a light-emitting diode array and a image-forming lens array may be used in place of the laser beam scanner units 227a–227d. As compared to the laser beam scanner unit, the LED head is small and includes no movable parts, making no noise during operation. Therefore, the LED head is suitably used in an image forming apparatus in a digital color copying machine of a tandem type which needs two or more writing units.

Now, referring to FIG. 2, an image processing section in the color image forming apparatus in accordance with the present embodiment will be described in terms of arrangement and functions. Those members in FIG. 2 that serve the same functions as those in FIG. 1 are designated by the same reference numbers.

The image processing section includes an image data input section 40, a computing section 41, an image memory 43 composed of a hard disk or a RAM (Random Access Memory), an image data output section 42, a CPU (Central Processing Unit) 44, an image editor 45, external interfaces 46, 47, and an image judging section 48.

The image data input section 40 is constituted by a 3-line CCD line sensor 116 for reading a black and white or color image on the original document and producing image signal outputs representing line data divided into component colors R, G, B (red, green, and blue components), a shading correction circuit 40b for correcting the level of an image signal output from the CCD 116, a line matching section 40c composed of a line buffer and other parts for compensating for displacement of line data of each color read by the 3-line CCD 116, a sensor color correcting section 40d for correcting colors with respect to the line data of each color, an MTF correcting section 40e for correcting line data of each color so that the variations of the pixels are sharp, and a γ correcting section 40f for correcting the brightness of the image to effect visual impression correction.

The computing section 41 includes a monochromatic data producing section 41a, an input processing section 41b, a area separating section 41c, a black producing section 41d, a color correction circuit 41e for each color, a zoom processing circuit 41f for each color, a spatial filter 41g for each color, print data input sections 41i, halftone processing sections 41h, and a trace pattern output section 41j.

The monochromatic data producing section 41a produces an image signal representing a monochrome image (black and white image) based on the line data of the component colors (R, G, and B image signals) from the image data input section 40. The input processing section 41b converts R, G, and B image signals to C, M, Y (cyan component, magenta component, yellow component) image signals corresponding to the second, third, and fourth image forming stations Pb, Pc, Pd in the image forming section 210 and also converts a clock signal.

The area separating section 41c separates an image represented by the image signals into a text area, a half dot photographic area, and a developing paper photographic area. The black producing section 41d produces a K (black component) image signal by executing a base color removing process based on the C, M, Y image signals from the input processing section 41a. The individual color correction circuits 41e corrects the colors represented by the C, M, Y image signals according to the color conversion table.

The individual zoom processing circuits 41f processes image signals so that the resultant image is enlarged or reduced in size according to a specified ratio. The halftone processing sections 41h effect halftone displays through multivalue error diffusion and multivalue dithering.

The C, M, Y, and K image signals processed by the halftone processing sections 41h of the computing section 41 are stored temporarily in the image memory 43. The C, M, Y, and K image signals are 8 bits signals (32 bits for the C, M, Y, K colors all combined) that are serially fed to each pixel. Such C, M, Y, and K image signals are stored on the hard disks 43a, 43b, 43c, 43d as the image data of the component colors.

The first, second, third, and fourth image forming stations Pa, Pb, Pc, Pd in the image forming section 210 are spaced apart from one another and form images at different timings. Therefore, the image data of the component colors on the hard disks 43a, 43b, 43c, 43d is temporarily stored in respective delay buffer memories 43e where the image data is delayed respectively before being fed to the image forming stations as the image signals representing the component colors. This way, the image forming stations can stack images on the single recording paper P with no displacement.

The image data output section 42 includes the laser beam scanner units 227a–227d and laser control units 42a for pulse-width modulating the drive signals from the laser beam scanner units according to the image signal of the component colors from the image memory 43. The laser beam scanner units 227a–227d receive inputs of the pulse-width modulated drive signals and control the output levels of the laser beams according to the drive signals.

The CPU 44 generally control the image processing section: specifically, it controls the image data input section 40, the computing section 41, the image memory 43, the image data output section 42, the image editor 45, and the external interfaces 46, 47 in a predetermined sequence.

The image editor 45 is for editing the image data in the image memory 43 in a predetermined manner and performs the editing process in the image memory 43. The image data in the image memory 43 is input through the image data input section 40 or the external interface 46 or 47 and processed by the computing section 41.

The external interface 46 is a communications interface where incoming image data is received through an external terminal (communications portable terminal, digital camera, digital video camera, etc.) of the image forming apparatus. The image data input through the external interface 46, before being stored in the image memory 43, is transformed into data that is compatible with the image forming apparatus 210 as it is temporarily input to the image processing section 41 where it is subjected to color spatial correction and other processes.

The external interface 47 is for inputting image data that is produced by a personal computer or received by facsimile transmission and can receive both black & white and color image data. The incoming image data fed through the external interfaces 47 is already C, M, Y, and K image signals and is subjected to a process in the halftone processing sections 41*h* and stored in the image memory 43.

Now, referring to FIG. 3, an operation control section in the color image forming apparatus in accordance with the present embodiment will be described in terms of arrangement and functions. Those members in FIG. 3 that serve the same functions as those in FIG. 1 or 2 are designated by the same reference numbers.

The operation control section includes the image data input section 40, the computing section 41, the image memory 43, the image data output section 42, and the CPU 44, all shown in FIG. 2, and additionally includes an operation PCB (Printed Circuit Board) unit 50, an ADF driver section 51, a disk driver section 52, an FCU driver section 53, a scanner driver section 54, and a printer driver section 55.

The CPU 44 transmits a control signal to each driver section 51–55 to sequence control these driver sections 51–55.

The CPU 44 is connected to the operation PCB unit 50 to establish communications with it. When an operation unit in the operation PCB unit 50 is operated by the operator, the operation PCB unit 50 produces a control signal representing copy mode according to that operation and transmits the control signal to the CPU 44. In response to the control signal, the CPU 44 generally controls the image processing section in FIG. 2 and the operation control section in FIG. 3 to performing copying in copy mode.

The CPU 44 transmits to the operation PCB unit 50 a control signal indicative of the current operating condition of the color image forming apparatus. The operation PCB unit 50 responds to this signal by causing a display section of the operation PCB unit 50 to produce a display of the current operating condition so as to inform the operator.

In a color image forming apparatus thus arranged, if the constituent K, C, M, and Y (black, cyan, magenta, and yellow) images formed in the first, second, third, and fourth image forming stations Pa, Pb, Pc, Pd and transferred by the fixer 217 onto the recording paper P are displaced on the recording paper P, the resultant color image does not have a sharp look, i.e., has low quality.

Accordingly, in accordance with the present embodiment, a set pattern image is formed on the recording paper P by the steps detailed below. Displacements of the component color images are measured using the set pattern image and completely compensated for.

First, a set pattern image Q0 is recorded on the recording paper P as shown in FIG. 4(*a*). The set pattern image Q0 is made of two black primary patterns K1, K1', as well as a yellow auxiliary pattern Y1, a cyan auxiliary pattern C1, and a magenta auxiliary pattern M1 that are interposed between the primary patterns K1, K1'. The set pattern image Q0 is characterized in that the centers of the auxiliary patterns C1, M1, Y1 lie on an assumed referential straight line H passing through the centers of the primary patterns K1, K1'.

To record the set pattern image Q0, the operation PCB unit 50 is operated to send a command to the CPU 44 work in test mode. In response to this, the CPU 44 controls the paper feeding mechanism 211, the transfer and transport belt mechanism 213, the transport switching gate 218, etc. to feed, transport, and eject the recording paper P. At the same time, the CPU 44 reads the set pattern image Q0 stored in advance in the image memory 43 and provides an image signal indicative of the set pattern image Q0 to the image data output section 42. The image data output section 42 controls the driving of the laser beam scanner units 227*a*–227*d* in the first through fourth image forming stations Pa–Pd according to the image signal. Thus, in the first through fourth image forming stations Pa–Pd, the laser beam scanner units 227*a*–227*d* write latent images to the photosensitive drums 222*a*–222*d* which are later developed by the developers 224*a*, 224*b*, 224*c*, 224*d*. The developed latent images, i.e., toner images, on the photosensitive drums 222*a*–222*d* are sequentially stacked and recorded on the moving recording paper P.

If the set pattern image Q0 in FIG. 4(*a*) is absolutely precisely recorded on the recording paper P by the foregoing process, there arises no problem at all and no need to compensate displacements of the component color images. Actually, the first through fourth image forming stations Pa–Pd inevitably have irregularity in operation and fail to precisely record the set pattern image Q0 in FIG. 4(*a*) on the recording paper P. A possible result is shown in FIG. 4(*b*) as the set pattern image Q1 in which the centers of the auxiliary patterns C1, M1, Y1 are displaced in an auxiliary scan direction off the referential straight line H passing through the centers of the primary patterns K1, K1'.

In this case, the recording paper P is placed on the original document platen 111, the image read section 110 is caused to read the set pattern image Q1 on the recording paper P, the displacements $\Delta C1$, $\Delta M1$, $\Delta Y1$ of the auxiliary patterns C1, M1, Y1 in the auxiliary scan directions off the referential straight line H are measured, and the displacements $\Delta C1$, $\Delta M1$, $\Delta Y1$ are compensated for.

To execute this, when the recording paper P is placed on the original document platen 111, the operation PCB unit 50 is operated to send a command to the CPU 44 to read the set pattern image Q1 on the recording paper P. In response to this, the CPU 44 controls the image read section 110 and the image data input section 40 to read the image. In the image data input section 40, the CCD line sensor 116 provides an output of line data of the component colors (R, G, B) which is then subjected to color correction, MTF correction, brightness correction, $\gamma$ correction, etc. Subsequently, in the computing section 41, C, M, Y, K image signals are produced from the line data of the component colors and subjected to various processes. The image signals are then stored temporarily in the image memory 43. The CPU 44 reads C, M, Y, K image signals in the image memory 43, obtains a set pattern image Q1 represented by the image signals, measures the displacements ΔC1, ΔM1, ΔY1 of the auxiliary patterns C1, M1, Y1 off the referential straight line H, and records the measurements.

After the measurement of the displacements ΔC1, ΔM1, ΔY1 is completed, the CPU 44, when recording a color image on the recording paper P, adjusts the write timings of the first through fourth image forming stations Pa–Pd in the auxiliary scan direction so that the displacements ΔC1, ΔM1, ΔY1 are 0. For example, when reading the C, M, Y, and K image signals representing the color image temporarily stored in the image memory 43, the displacements of the component color images are compensated for by adjusting the read timings for the C, M, Y image signals according to the displacements ΔC1, ΔM1, ΔY1. As a result, the color image recorded on the recording paper P has improved quality.

These displacements ΔC1, ΔM1, ΔY1 off the referential straight line H passing through the centers of the primary patterns K1, K1' are the sums of the displacements accumulated during the process that begins with the recording and ends with the reading of the set pattern image Q0 in FIG. 4(a) on the recording paper P. Therefore, the displacements caused by the photosensitive drums 222a–222d, the CCD sensor 116, etc. are eliminated all together by the foregoing steps.

The displacements ΔC1, ΔM1, ΔY1 are those off the referential straight line H passing through the centers of the primary patterns K1, K1'. Therefore, when reading the set pattern image Q1 on the recording paper P, even if the recording paper P is placed tilting on the original document platen 111, for example, as shown in FIG. 4(c), the displacements ΔC1, ΔM1, ΔY1 can be precisely obtained. In other words, even if the recording paper P is placed tilting on the original document platen 111 or out of a predetermined position, the displacements ΔC1, ΔM1, ΔY1 off the referential straight line H passing through the centers of the primary patterns K1, K1' never vary on the recording paper P. Therefore, in accordance with the present embodiment, the measurement of a displacement does not vary due to inappropriate positioning of the recording paper as in conventional cases.

Figure 5:
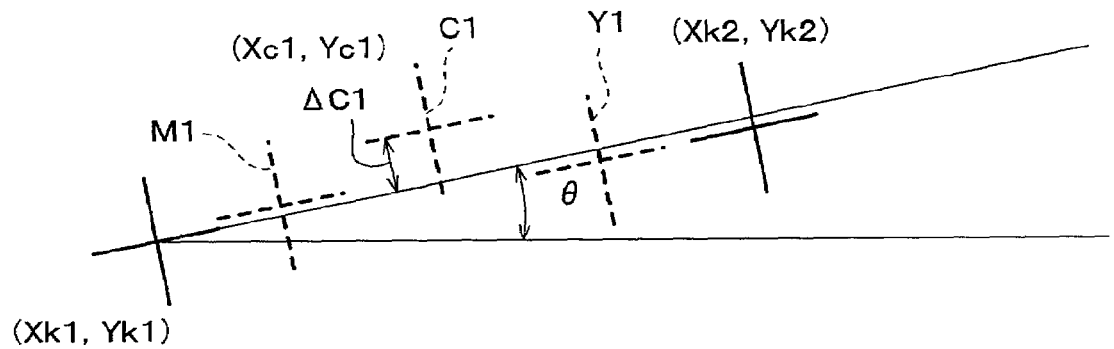
FIG. 5 is a drawing illustrating steps to compute a displacement of an auxiliary pattern with respect to a referential straight line linking primary patterns.

Specifically, as shown in FIG. 5, provided that the locations of the centers of the primary patterns K1, K1' are given as (Xk1, Yk1), (Xk2, Yk2), and the location of the center of the cyan auxiliary pattern C1 as (Xc1, Yc1), the inclination θ of the referential straight line H passing through the centers (Xk1, Yk1), (Xk2, Yk2) of the primary patterns K1, K1' is given by equation (1), and the displacement ΔC1 of the cyan auxiliary pattern C1 is given by equation (2):

$$\theta = \arctan((Yk2-Yk1)/(Xk2-Xk1)) \quad (1)$$

$$\Delta C1 = (Xc1-Xk1)\sin(-\theta) + (Yc1-Yk1)\cos(-\theta) \quad (2)$$

The displacements ΔY1, ΔM1 of the yellow and magenta auxiliary patterns Y1, M1 can be obtained similarly.

To obtain locations of the centers of the primary pattern and the auxiliary pattern, for example, a histogram is drawn for each pixel constituting the pattern, and the pixel that gives a peak is designated as the location of the center (see, for example, aforementioned Japanese Laid-Open Patent Application No. 6-95474/1994). In this case, the pattern is preferably shaped like a cross. Any other known method may be applied as long as the location of the center of the pattern can be specified.

In addition, the auxiliary patterns are preferably interposed between the primary patterns, since the position of the straight line can be determined with increasing precision if the primary patterns are separated by a greater interval.

Incidentally, the measurements of the displacements of the auxiliary patterns become irregular depending on in which part of the surface of the photosensitive drum the auxiliary patterns are recorded, if the photosensitive drum is eccentric, or for other potential causes. When this is the case, the displacement in the auxiliary scan direction cannot be precisely obtained from the displacement of only one auxiliary pattern.

Accordingly, a plurality of set pattern images Q0 are formed in the auxiliary scan direction as shown in FIG. 6(a) and recorded on the recording paper P. Supposing that the result is the set pattern images Q1 appearing on the recording paper P as shown in FIG. 6(b), a referential straight line H passing through the primary patterns K1, K1', a referential straight line H passing through the primary patterns K2, K2', a referential straight line H passing through the primary patterns K3, K3', and a referential straight line H passing through the primary patterns K4, K4' are obtained for the set pattern images Q1. Then, the displacements ΔY1, ΔY2, ΔY3, ΔY4 of the yellow auxiliary patterns Y1, Y2, Y3, Y4 off the referential straight lines H are obtained and averaged. Similarly, the displacements of the cyan and magenta auxiliary patterns off the straight lines are obtained and averaged.

After obtaining the average displacement of each color, when recording a color image on the recording paper P, the displacements of the component color images are compensated for in the auxiliary scan direction by adjusting the write timings of the first through fourth image forming stations Pa–Pd in the auxiliary scan direction so that the average displacements are 0.

Summarizing the immediately foregoing description, an average value of the displacements of the auxiliary patterns of the same color arranged in the auxiliary scan direction is obtained, and the displacement of the image of that color in the auxiliary scan direction is compensated for according to the average value. In this manner, the adverse effects of the irregular displacements due to the eccentricity of the photosensitive drum or for other potential reasons are minimized, and the color displacement is restrained satisfactorily in any position in the auxiliary scan direction.

In the description so far, the displacements of the component color images were measured only in the auxiliary scan direction. The displacements are measurable in the main scan direction by similar steps as in the auxiliary scan. Specifically, a set pattern image is recorded on the recording paper in the auxiliary scan direction to obtain a referential straight line passing through the primary patterns, and the displacement of the auxiliary pattern off the referential straight line is obtained in the main scan direction for each color. The displacements of the component color images in the main scan direction are compensated for differently from those in the auxiliary scan direction, specifically, by adjusting the write timing at the leading edges of the cyan, magenta, and yellow patterns formed by the second through fourth image forming stations Pb–Pd relative to the write timing at the leading edge of the black pattern serving as a reference for the first image forming station Pa.

The displacements in the main scan direction are caused by the recording paper P and the photosensitive drum that shake and again become irregular depending on the position in the main scan direction. To restrain the adverse effects of the irregularity in the displacements, a plurality of set pattern images Q0 may be arranged in the main scan direction as shown in FIG. 7(a), recorded on the recording paper P, and subjected to measurement.

Figure 7:
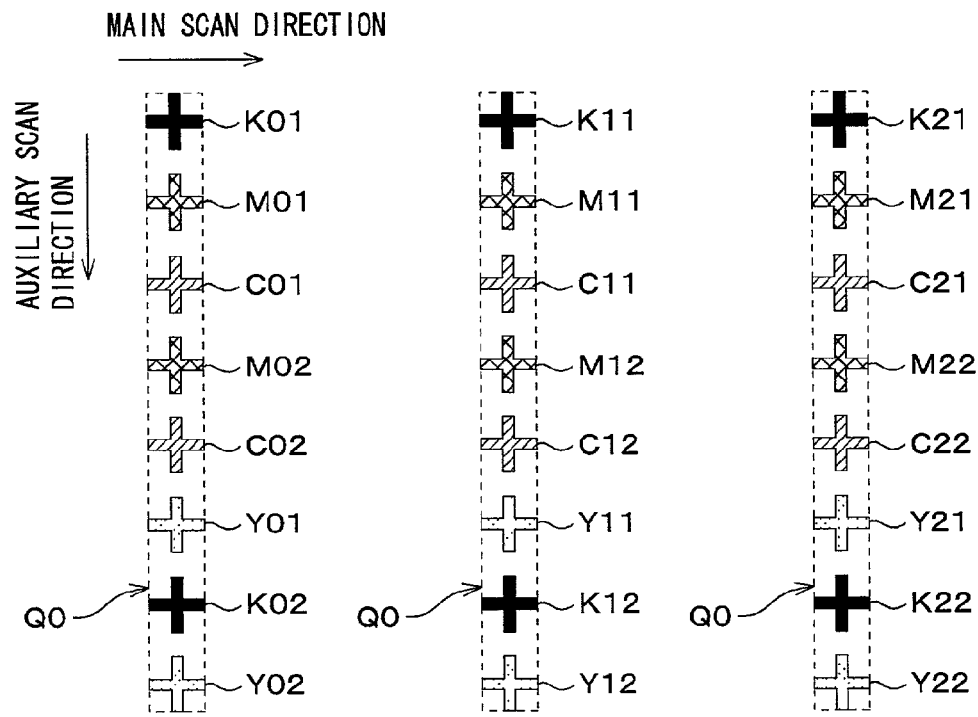
FIG. 7(a) is a drawing showing set pattern images arranged in a main scan direction.
FIG. 7(b) is a drawing showing the set pattern images FIG. 7(a) being formed on recording paper.
Figure 7:
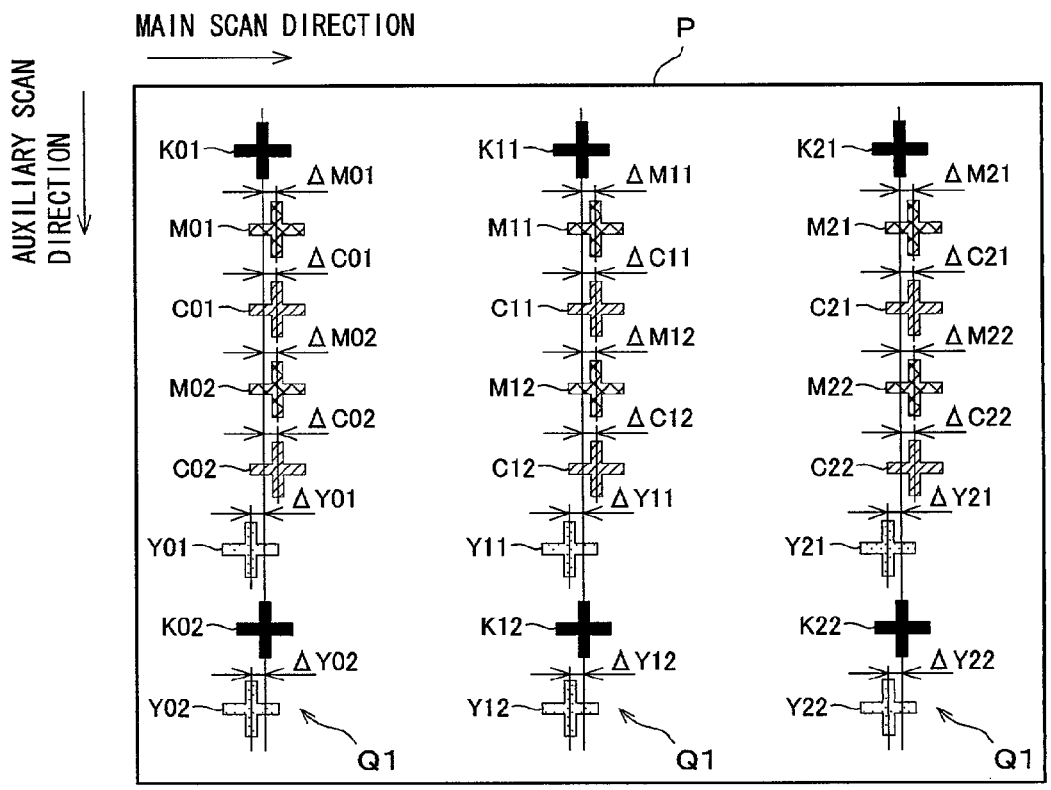

However, even if the set pattern images Q1 are obtained on the recording paper P as shown on FIG. 7(b) for example, the displacement of the leading auxiliary pattern of each color in a main scan direction affects the displacement of the subsequent auxiliary patterns of that color. It is therefore of no use to simply average the displacements of the auxiliary patterns of the same color in the main scan direction similarly to the foregoing averaging of the displacements in the auxiliary scan direction.

Figure 8:
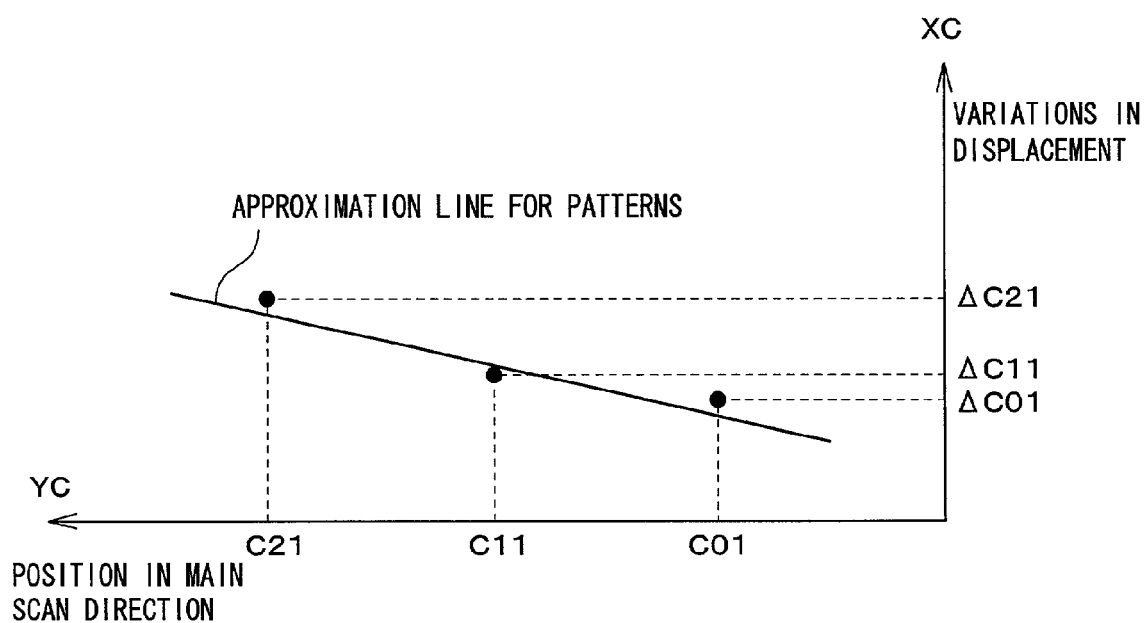
FIG. 8 is a graph showing variations in the displacement according to the position of the auxiliary pattern in the main scan direction.

Now, attention should be paid to, for example, the displacements $\Delta C01$, $\Delta C11$, $\Delta C21$ of cyan auxiliary patterns C01, C11, C21 in FIG. 7(b), and it would be understood that the displacements $\Delta C01$, $\Delta C11$, $\Delta C21$ are in proportion to the positions of the auxiliary patterns C01, C11, C21 in the main scan direction as shown in FIG. 8. The position YC is given by equation (3):

$$YC = aXC + b \qquad (3)$$

where YC is the position of an auxiliary pattern and XC is the displacement of the auxiliary pattern.

In the equation (3), the coefficient b represents the displacement of the write timing at the leading edges of the cyan pattern formed by the second image forming station Pb relative to the write timing at the leading edge of the black pattern serving as a reference for the first image forming station Pa. The coefficient a represents the correction amount of the frequency of the write clock signal for the second image forming station Pb. Therefore, the displacements of the cyan image can be compensated for in the main scan direction by determining the coefficients a, b from equation (3) based on the displacements $\Delta C01$, $\Delta C11$, $\Delta C21$ and the positions of the auxiliary patterns C01, C11, C21 and then adjusting the write timing and the frequency of the write clock signal at the leading edge of the cyan pattern based on the coefficients a, b.

Similarly, the displacements (=b) of the write timing at the leading edge of the magenta and yellow patterns and the correction amounts (=a) of the frequency of the write clock signal for the third and fourth image forming stations Pc, Pd may be obtained, from equation (3), relative to the write timing at the leading edge of the black pattern serving as a reference.

As shown in FIG. 7(a) and FIG. 7(b), if two or more cyan auxiliary patterns are arranged in a single set pattern image, the displacements of the cyan auxiliary patterns are averaged for each set pattern image, and the obtained average values can be caused to match the variable XC of equation (3). Similarly, the displacements of the magenta and yellow auxiliary patterns are averaged respectively for each set pattern image, and the obtained average values can be caused to match the variable XC of equation (3). The irregularity of the displacements in the auxiliary scan direction can be restrained by the use of the obtained average values of the displacements.

Further, instead of completely independently carrying out (1) the recording of the set pattern images in the main scan direction and the measurement and compensation for the displacements in the auxiliary scan direction and (2) the recording of the set pattern images in the auxiliary scan direction and the measurement and compensation for the displacement in the main scan direction, set pattern images may be simultaneously recorded in the main scan direction and in the auxiliary scan direction, and the displacements may be sequentially compensated for in the auxiliary scan direction and the main scan direction. For example, as shown in FIG. 9, a plurality of set pattern images Q01 are arranged in the auxiliary scan direction, a plurality of set pattern images Q02 are recorded on the recording paper P in the main scan direction, an average value of the displacements is measured in the auxiliary scan direction based on the set pattern images Q01, an average value of the displacements is measured in the main scan direction based on the set pattern images Q02, and the displacements are sequentially compensated for in the auxiliary scan direction and in the main scan direction based on the average value of the displacements in the auxiliary scan direction and the average value of the displacements in the main scan direction.

Next, as described earlier, in order to restrain adverse effects of irregularity in displacements in the auxiliary scan direction caused by the eccentricity of the photosensitive drum or for other potential reasons, a plurality of set pattern images are arranged and recorded in the auxiliary scan direction, and auxiliary patterns of the same color are arranged in a single set pattern image in the auxiliary scan direction; however, in any case, the greater the number of the auxiliary patterns of the same color, the greater the total number of the patterns of the four (C, M, Y, K) colors, and the longer it takes to perform the measurement and computation.

Figure 10:
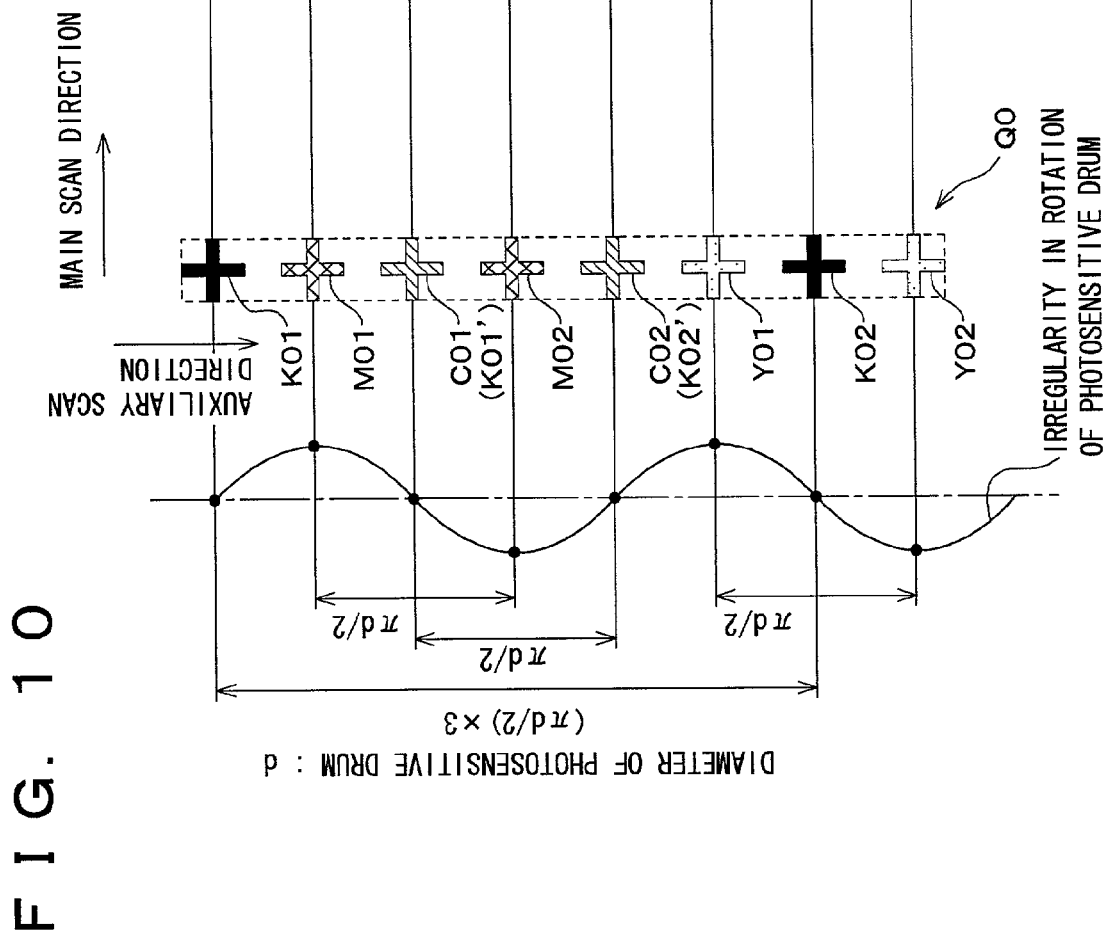
FIG. 10 is a drawing showing set pattern images positioned at predetermined places in the main scan direction.

Therefore, it is preferred to optimize precision in measurement, while keeping the number of the auxiliary patterns of the color as small as possible. For example, if the set pattern images Q0 are recorded with their longitudinal sides in the auxiliary scan direction as shown in FIG. 10 (here, the set pattern images Q0 are arranged in the main scan direction), the positions of the auxiliary patterns of the same color in a single set pattern image Q0 is determined by equation (4):

$$xs = T/n \times (N-1) + n' \times T \qquad (4)$$

where n is the number of the auxiliary patterns of the same color arranged in a single set pattern image Q0, T is the length of the circumference of the photosensitive drum, N is the sequence in which the n auxiliary patterns are arranged, and xs is the positions of the n auxiliary patterns, and n' is any given integral number.

According to equation (4), each of the n auxiliary patterns is separated from adjacent ones by an interval of 1/n times the length, T, of the circumference of the photosensitive drum. In FIG. 10, $T=\pi d$ (d is the diameter of the photosensitive drum), n=2, and n'=0. Since irregularity occurs in rotation of the photosensitive drum at a cycle equivalent to the length of the circumference $\pi d$ as shown in FIG. 10, if the displacements of the n auxiliary patterns recorded on the recording paper P so that each one is separated from adjacent ones by an interval of 1/n times the length, T, of the circumference are averaged, errors in the displacements caused by the irregular rotation of the photosensitive drum can be substantially offset.

By thus obtaining the average value of the displacements of the auxiliary patterns, measurement precision is improved, while keeping the number of the auxiliary patterns of the color as small as possible.

Further, by recording two groups of primary patterns, each of which includes two or more primary patterns, not only the auxiliary patterns, in the auxiliary scan direction, obtaining an average recording position of the primary patterns for each group, and obtaining a referential straight line H passing through the average recording positions of the groups, adverse effects of the irregular rotation of the photosensitive drum on this referential straight line H can be reduced, and errors of the displacements of the auxiliary patterns off the referential straight line H can be restrained. When this is the case, the positions of the primary patterns are given for each group by equation (5):

$$xm = T/2 \times (N-1) + n' \times T \qquad (5)$$

where T is the length of the circumference of the photosensitive drum, N is the sequence in which the primary patterns are arranged in each group, n' is any given integral number, and xm is the positions of the primary patterns of each group.

According to equation (5), the primary patterns are arranged so that each of them is separated from adjacent ones by an interval of ½ times the length, T, of the circumference of the photosensitive drum. For example, in FIG. 10, a black primary pattern K01' is substituted for the auxiliary pattern C01 with the black primary patterns K01, K01' forming a group. A black primary pattern K02' is substituted for the auxiliary pattern C02 with the black primary patterns K02, K02' forming a group. Average positions of the primary patterns recorded on the recording paper P are obtained for each group, and a referential straight line H passing through the average position of the two groups is obtained.

Meanwhile, if the set pattern images Q0 are arranged in the auxiliary scan direction as shown in FIG. 11, the positions of the auxiliary patterns of the same color are given by equation (6):

$$y = T/m \times (S-1) + n' \times T \qquad (6)$$

where m is the number of the set pattern images Q0, T is the length of the circumference of the photosensitive drum, S is the sequence in which the m set pattern images Q0 are arranged, n' is any given integral number, and y is the positions of the m set pattern images Q0.

According to equation (6), the m auxiliary patterns are arranged so that each of them is separated from adjacent ones by an interval of 1/m times the length, T, of the circumference of the photosensitive drum. In FIG. 11, T=πd, m=4, and n'=0. Since irregularity occurs again in rotation of the photosensitive drum at a cycle equivalent to the length of the circumference πd, if the displacements of the m auxiliary patterns of the same color recorded on the recording paper P so that each one is separated from adjacent ones by an interval of 1/m times the length, T, of the circumference are averaged, errors in the displacements caused by the irregular rotation of the photosensitive drum can be substantially offset.

(i) As described so far, the image forming apparatus in accordance with the present embodiment measures the displacement of an auxiliary pattern off the straight line passing through primary patterns. In this case, even if the recording medium tilts or is out of a predetermined position when it is read, since the auxiliary pattern does not move relative to the straight line passing through the primary patterns, the displacement of the auxiliary pattern can be precisely measured. Therefore, according to the measurement of this displacement, the displacements of the component color images stacked by the plurality of image forming means can be compensated for with high precision. Further, the measurement does not need to be repeated. Adjustment operation can be facilitated and requires less time.

(ii) In the image forming apparatus, it is preferable if the auxiliary pattern is recorded between the primary patterns. In this case, the primary patterns are separated, and the straight line passing through the primary patterns are measured with increased precision. A result is increased precision in measuring the displacement of the auxiliary pattern. Besides, adverse effects from the bow of LSU is lessened, and measurement precision improves.

(iii) In the image forming apparatus (i) or (ii), it is preferable if, provided that the auxiliary scan direction is defined as the transport direction of the recording medium and the main scan direction is defined as the direction perpendicular to the auxiliary scan direction, the recording means records the primary patterns and the auxiliary pattern as a set pattern image in the auxiliary scan direction and records a plurality of set pattern images arranged in the main scan direction, the measurement means measures the displacement of the auxiliary pattern off the straight line passing through the primary patterns for each set pattern image, and the adjusting means compensates for the displacements of the component color images in the main scan direction according to an average value of the displacements measured on the set pattern images.

Here, the displacements measured on the set pattern images occur in the main scan direction, and the displacements of the images in the main scan direction are compensated for according to the average value of these displacements. By using the average value of the displacements in the main scan direction in this manner, irregularity in displacements can be reduced which occurs in the main scan direction due to shaking of the recording medium and image carriers in the image forming means. Precision thus improves in both the measurement and correction of displacements.

(iv) Alternatively, in the image forming apparatus, it is preferable if, provided that the auxiliary scan direction is defined as the transport direction of the recording medium and the main scan direction is defined as the direction perpendicular to the auxiliary scan direction, the recording means records the primary patterns and the auxiliary pattern as a set pattern image in the main scan direction and records a plurality of set pattern images arranged in the auxiliary scan direction, the measurement means measures the displacement of the auxiliary pattern off the straight line passing through the primary patterns for each set pattern image, and the adjusting means compensates for the displacements of the component color images in the auxiliary scan direction according to an average value of the displacements measured on the set pattern images.

Here, the displacements measured on the set pattern images occur in the auxiliary scan direction, and the displacements of the images in the auxiliary scan direction are compensated for according to the average value of these displacements. By using the average value of the displacements in the auxiliary scan direction in this manner, irregularity in displacements can be reduced which occurs in the auxiliary scan direction due to the transport speed of the recording medium. Precision thus improves in both the measurement and correction of displacements.

(v) In the image forming apparatus (iii) or (iv), it is preferable if the recording means records both the set pattern images (the first set pattern images) of the image forming apparatus (iii) and the set pattern images (the second set pattern images) of the image forming apparatus (iv), the measurement means measures the displacement both for each of the first set pattern images and for each of the second set pattern images, and the adjusting means compensates for the displacements of the component color images both in the main scan direction and in the auxiliary scan direction according to the average value of the displacements measured on the first set pattern images and the average value of the displacements measured on the second set pattern images. This enables the advantages of the image forming apparatuses (iii) and (iv) to be obtained at the same time.

(vi) In the image forming apparatus (iii) or (v), it is preferred if there are provided n auxiliary patterns of an identical kind in the set pattern image in the auxiliary scan direction, the positions, xs, of the n auxiliary patterns are given by equation (4) defined above, where T is the length of the circumference of the image carrier in the image forming means, N is the sequence in which the n auxiliary patterns are arranged, and n' is any given integral number, the measurement means measures an average value of the displacements of the n auxiliary patterns off the straight line passing through the primary patterns for each set pattern image, and the adjusting means compensates for the displacements of the component color images in the main scan direction according to the total average value of the average values obtained from the set pattern images.

Here, the n auxiliary patterns are arranged in the auxiliary scan direction in the positions given by equation (4). In this case, if the set pattern images are recorded on the recording medium and the average value of the displacements of the recorded auxiliary patterns is obtained, irregularity of the displacements can be effectively reduced which occurs in the auxiliary scan direction due to periodical irregularity in rotation of the image carrier, while reducing the auxiliary patterns to the required smallest number. Precision thus improves in both the measurement and correction of displacements.

(vii) In the image forming apparatus (iii), (v), or (vi), it is preferable if, the primary patterns are located in a set pattern image in the auxiliary scan direction and divided into two groups, the positions, xm, of the primary patterns are given for each group by equation (5) defined above, where T is the length of the circumference of the image carrier in the image forming means, N is the sequence in which the primary patterns are arranged in each group, and n' is any given integral number, and the measurement means averages the recording positions of the primary patterns for each group to obtain an average recording position and measures the displacements of the auxiliary patterns or an average value of the displacements of the auxiliary patterns off the straight line passing through the average recording positions for each group, the measurement being repeatedly done for each set pattern image.

Here, the positions of the primary patters are specified for each group as in equation (5). The recording position of the primary patterns are averaged for each group on the recording medium to obtain an average recording position, and the displacements of the auxiliary patterns or an average value of the displacements of the auxiliary patterns off the straight line passing through the average recording positions are measured on the groups. In this manner, irregularity of the displacements can be effectively reduced which occurs in the auxiliary scan direction due to periodical irregularity in rotation of the image carrier, while reducing the primary patterns to the required smallest number. Precision thus improves in both the measurement and correction of displacements.

(viii) In the image forming apparatus (iv) or (v), it is preferable if, the positions, y, of the m set pattern images are given by equation (6) defined above, where m is the number of the set pattern images, T is the length of the circumference of the image carrier in the image forming means, S is the sequence in which the m set pattern images are arranged, and n' is any given integral number.

Here, the m set pattern images are arranged in the auxiliary scan direction in the positions given by equation (6). In this case, irregularity of the displacements can be effectively reduced which occurs in the auxiliary scan direction due to periodical irregularity in rotation of the image carrier, while reducing the set pattern images to the required smallest number. Precision thus improves in both the measurement and correction of displacements.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

In other words, the present invention is not limited to the embodiment and may vary. For example, the primary patterns and the auxiliary patterns may be formed in different shapes. Further, to compensate for the displacements of the component color images in the auxiliary scan direction and in the main scan direction, the rotation rate of the polygon mirror may be changed instead of changing the read timings of image signals from an image memory. Any combination of these arrangements is a further alternative to compensate for the displacements of the component color images.

What is claimed is:

1. An image forming apparatus for stacking and thus recording component color images on a recording medium using a plurality of image forming means, while transporting the recording medium down along a transport path, comprising:

pattern recording means for recording at least two primary patterns on the recording medium using one of the plurality of image forming means and also for recording an auxiliary pattern on the recording medium using another one of the plurality of image forming means;

measurement means for measuring a displacement of the auxiliary pattern off a straight line passing through the primary patterns on the recording medium; and adjusting means for compensating for displacements of the component color images stacked by the plurality of image forming means according to a measurement of the displacement of the auxiliary pattern.

2. The image forming apparatus as defined in claim 1, wherein:

the pattern recording means records the primary patterns and the auxiliary pattern as a set pattern image in an auxiliary scan direction in which the recording medium is transported and records a plurality of set pattern images arranged in the main scan direction that is perpendicular to the auxiliary scan direction;

the measurement means measures the displacement of the auxiliary pattern off the straight line passing through the primary patterns for each set pattern image; and the adjusting means compensates for the displacements of the component color images in the main scan direction according to an average value of the displacements measured on the set pattern images.

3. The image forming apparatus as defined in claim 2, wherein:

the primary patterns are located in the set pattern image in the auxiliary scan direction and divided into two groups, the apparatus further comprising:

position determining means for determining positions, xm, of the primary patterns for each group according to the equation:

$$xm = T/2 \times (N-1) + n' \times T$$

where T is a length of a circumference of an image carrier in the image forming means, N is a sequence in which the primary patterns are arranged in each group, and n' is any given integral number, wherein:

the measurement means averages recording positions of the primary patterns for each group to obtain an average recording position and measures the displacement of the auxiliary pattern or an average value of displacements of auxiliary patterns of an identical kind off the straight line passing through the average recording positions for each group, the measurement being repeatedly done for each set pattern image.

4. The image forming apparatus as defined in claim 2, wherein:

there are provided n auxiliary patterns of an identical kind in the set pattern image in the auxiliary scan direction, the apparatus further comprising:

first position determining means for determining positions, xs, of the n auxiliary patterns according to the equation:

$$xs = T/n \times (N-1) + n' \times T$$

where T is a length of a circumference of an image carrier in the image forming means, N is a sequence in which the n auxiliary patterns are arranged, and n' is any given integral number, wherein:

the measurement means measures an average value of displacements of the n auxiliary patterns off the straight line passing through the primary patterns for each recorded set pattern image; and the adjusting means compensates for displacements of the component color images in the main scan direction according to a total average value of the average values obtained from the set pattern images.

5. The image forming apparatus as defined in claim 4, wherein:

the primary patterns are located in the set pattern image in the auxiliary scan direction and divided into two groups, the apparatus further comprising:

second position determining means for determining positions, xm, of the primary patterns for each group according to the equation:

$$xm = T/2 \times (N-1) + n' \times T$$

where T is a length of a circumference of an image carrier in the image forming means, N is a sequence in which the primary patterns are arranged in each group, and n' is any given integral number, wherein:

the measurement means averages recording positions of the primary patterns for each group to obtain an average recording position and measures the displacement of the auxiliary pattern or an average value of displacements of auxiliary patterns of an identical kind off the straight line passing through the average recording positions for each group, the measurement being repeatedly done for each set pattern image.

6. The image forming apparatus as defined in claim 1, wherein:

the pattern recording means records the primary patterns and the auxiliary pattern as a set pattern image in a main scan direction that is perpendicular to a direction in which the recording medium is transported and records a plurality of set pattern images arranged in an auxiliary scan direction in which the recording medium is transported;

the measurement means measures the displacement of the auxiliary pattern off the straight line passing through the primary patterns for each set pattern image; and the adjusting means compensates for the displacements of the component color images in the auxiliary scan direction according to an average value of the displacements measured on the set pattern images.

7. The image forming apparatus as defined in claim 6, further comprising:

wherein:

there are provided m set pattern images, the apparatus further comprising:

position determining means for determining positions, y, of the m set pattern images according to the equation:

$$y = T/m \times (S-1) + n' \times T$$

where T is a length of a circumference of an image carrier in the image forming means, S is a sequence in which the m set pattern images are arranged, and n' is any given integral number.

8. The image forming apparatus as defined in claim 1, wherein:

the pattern recording means records the primary patterns and the auxiliary pattern as a first set pattern image in an auxiliary scan direction in which the recording medium is transported and records the plurality of first set pattern images arranged in the main scan direction that is perpendicular to the auxiliary scan direction, as well as, records the primary patterns and the auxiliary pattern as a second set pattern image in the main scan direction and records a plurality of second set pattern images arranged in the auxiliary scan direction;

the measurement means measures the displacement both for each of the first set pattern images and for each of the second set pattern images; and the adjusting means compensates for the displacements of the component color images both in the main scan direction and in the auxiliary scan direction according to an average value of the displacements measured on the first set pattern images and an average value of the displacements measured on the second set pattern images.

9. The image forming apparatus as defined in claim 8, wherein:

the primary patterns are located in a first pattern image and divided into two groups, the apparatus further comprising:

position determining means for determining positions, xm, of the primary patterns for each group according to the equation:

$$xm = T/2 \times (N-1) + n' \times T$$

where T is a length of a circumference of an image carrier in the image forming means, N is a sequence in which the primary patterns are arranged in each group, and n' is any given integral number, wherein:

the measurement means averages recording positions of the primary patterns for each group to obtain an average recording position and measures the displacement of the auxiliary pattern or an average value of displacements of auxiliary patterns of an identical kind off the straight line passing through the average recording positions for each group, the measurement being repeatedly done for each set pattern image.

10. The image forming apparatus as defined in claim 8, wherein:
there are provided m set pattern images, the apparatus further comprising:
position determining means for determining positions, y, of the m set pattern images according to the equation:

$$y=T/m\times(S-1)+n'\times T$$

where T is a length of a circumference of an image carrier in the image forming means, S is a sequence in which the m set pattern images are arranged, and n' is any given integral number.

11. The image forming apparatus as defined in claim 1, wherein:
the auxiliary pattern is recorded between the primary patterns.

12. The image forming apparatus as defined in claim 11, wherein:
the pattern recording means records the primary patterns and the auxiliary pattern as a set pattern image in an auxiliary scan direction in which the recording medium is transported and records a plurality of set pattern images arranged in the main scan direction that is perpendicular to the auxiliary scan direction;
the measurement means measures the displacement of the auxiliary pattern off the straight line passing through the primary patterns for each set pattern image; and
the adjusting means compensates for the displacements of the component color images in the main scan direction according to an average value of the displacements measured on the set pattern images.

13. The image forming apparatus as defined in claim 12, wherein:
the primary patterns are located in the set pattern image in the auxiliary scan direction and divided into two groups, the apparatus further comprising:
position determining means for determining positions, xm, of the primary patterns for each group according to the equation:

$$xm=T/2\times(N-1)+n'\times T$$

where T is a length of a circumference of an image carrier in the image forming means, N is a sequence in which the primary patterns are arranged in each group, and n' is any given integral number,
wherein:
the measurement means averages recording positions of the primary patterns for each group to obtain an average recording position and measures the displacement of the auxiliary pattern or an average value of displacements of auxiliary patterns of an identical kind off the straight line passing through the average recording positions for each group, the measurement being repeatedly done for each set pattern image.

14. The image forming apparatus as defined in claim 12, wherein:
there are provided n auxiliary patterns of an identical kind in the set pattern image in the auxiliary scan direction, the apparatus further comprising:
position determining means for determining positions, xs, of the n auxiliary patterns according to the equation:

$$xs=T/n\times(N-1)+n'\times T$$

where T is a length of a circumference of an image carrier in the image forming means, N is a sequence in which the n auxiliary patterns are arranged, and n' is any given integral number,
wherein:
the measurement means measures an average value of displacements of the n auxiliary patterns off the straight line passing through the primary patterns for each recorded set pattern image; and
the adjusting means compensates for displacements of the component color images in the main scan direction according to a total average value of the average values obtained from the set pattern images.

15. The image forming apparatus as defined in claim 11, wherein:
the pattern recording means records the primary patterns and the auxiliary pattern as a set pattern image in a main scan direction that is perpendicular to a direction in which the recording medium is transported and records a plurality of set pattern images arranged in an auxiliary scan direction in which the recording medium is transported;
the measurement means measures the displacement of the auxiliary pattern off the straight line passing through the primary patterns for each set pattern image; and
the adjusting means compensates for the displacements of the component color images in the auxiliary scan direction according to an average value of the displacements measured on the set pattern images.

16. The image forming apparatus as defined in claim 15, wherein:
there are provided m set pattern images,
the apparatus further comprising:
position determining means for determining positions, y, of the m set pattern images according to the equation:

$$y=T/m\times(S-1)+n'\times T$$

where T is a length of a circumference of an image carrier in the image forming means, S is a sequence in which the m set pattern images are arranged, and n' is any given integral number.

17. The image forming apparatus as defined in claim 11, wherein:
the pattern recording means records the primary patterns and the auxiliary pattern as a first set pattern image in an auxiliary scan direction in which the recording medium is transported and records the plurality of first set pattern images arranged in the main scan direction that is perpendicular to the auxiliary scan direction, as well as, records the primary patterns and the auxiliary pattern as a second set pattern image in the main scan direction and records a plurality of second set pattern images arranged in the auxiliary scan direction;
the measurement means measures the displacement both for each of the first set pattern images and for each of the second set pattern images; and
the adjusting means compensates for the displacements of the component color images both in the main scan direction and in the auxiliary scan direction according to an average value of the displacements measured on the first set pattern images and an average value of the displacements measured on the second set pattern images.

18. The image forming apparatus as defined in claim 17, wherein:
there are provided m set pattern images,
the apparatus further comprising:

position determining means for determining positions, y, of the m set pattern images according to the equation:

$$y = T/m \times (S-1) + n' \times T$$

where T is a length of a circumference of an image carrier in the image forming means, S is a sequence in which the m set pattern images are arranged, and n' is any given integral number.

19. The image forming apparatus as defined in claim 17, wherein:

the primary patterns are located in a first pattern image and divided into two groups, the apparatus further comprising:

position determining means for determining positions, xm, of the primary patterns for each group according to the equation:

$$xm = T/2 \times (N-1) + n' \times T$$

where T is a length of a circumference of an image carrier in the image forming means, N is a sequence in which the primary patterns are arranged in each group, and n' is any given integral number, wherein:

the measurement means averages recording positions of the primary patterns for each group to obtain an average recording position and measures the displacement of the auxiliary pattern or an average value of displacements of auxiliary patterns of an identical kind off the straight line passing through the average recording positions for each group, the measurement being repeatedly done for each set pattern image.

20. The image forming apparatus as defined in claim 17, wherein:

there are provided n auxiliary patterns of an identical kind in the first set pattern image the apparatus further comprising:

first position determining means for determining positions, xs, of the n auxiliary patterns according to the equation:

$$xs = T/n \times (N-1) + n' \times T$$

where T is a length of a circumference of an image carrier in the image forming means, N is a sequence in which the n auxiliary patterns are arranged, and n' is any given integral number, wherein:

the measurement means measures an average value of displacements of the n auxiliary patterns off the straight line passing through the primary patterns for each recorded set pattern image; and the adjusting means compensates for displacements of the component color images in the main scan direction according to a total average value of the average values obtained from the set pattern images.

21. The image forming apparatus as defined in claim 20, wherein:

the primary patterns are located in the set pattern image in the auxiliary scan direction and divided into two groups, the apparatus further comprising:

second position determining means for determining positions, xm, of the primary patterns for each group according to the equation:

$$xm = T/2 \times (N-1) + n' \times T$$

where T is a length of a circumference of an image carrier in the image forming means, N is a sequence in which the primary patterns are arranged in each group, and n' is any given integral number, wherein:

the measurement means averages recording positions of the primary patterns for each group to obtain an average recording position and measures the displacement of the auxiliary pattern or an average value of displacements of auxiliary patterns of an identical kind off the straight line passing through the average recording positions for each group, the measurement being repeatedly done for each set pattern image.

22. An image forming apparatus for stacking and recording component color images on a recording medium using a plurality of image forming units arranged along a recording medium transport path, a first one of the plurality of image forming units for recording at least two primary patterns on the recording medium and a second one of the plurality of image forming unit for recording an auxiliary pattern on the recording medium, the apparatus comprising:

a sensor for measuring a displacement of the auxiliary pattern off a straight line passing through the at least two primary patterns on the recording medium; and a computing section for compensating for displacements of the component color images stacked by the plurality of image forming units according to a measurement of the displacement of the auxiliary pattern.

23. A method for stacking and recording component color images on a recording medium using a plurality of image forming units while transporting the recording medium along a transport path, comprising the steps of:

recording at least two primary patterns on the recording medium using one of the plurality of image forming units;

recording an auxiliary pattern on the recording medium using another one of the plurality of image forming units;

measuring a displacement of the auxiliary pattern off a straight line passing through the primary patterns on the recording medium; and compensating for displacements of the component color images stacked by the plurality of image forming units according to a measurement of the displacement of the auxiliary pattern.

* * * * *